United States Patent
Pursifull

(10) Patent No.: US 9,267,445 B2
(45) Date of Patent: Feb. 23, 2016

(54) METHODS FOR ADJUSTING FUEL COMPOSITION TO INCREASE LIQUID FUEL HEAT TOLERANCE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 14/023,214

(22) Filed: Sep. 10, 2013

(65) Prior Publication Data
US 2015/0068495 A1 Mar. 12, 2015

(51) Int. Cl.
| F02D 19/08 | (2006.01) |
| F02M 41/00 | (2006.01) |
| F02M 43/00 | (2006.01) |
| F02D 19/06 | (2006.01) |

(52) U.S. Cl.
CPC .......... *F02D 19/081* (2013.01); *F02D 19/0628* (2013.01); *F02D 19/0647* (2013.01); *F02D 19/08* (2013.01); *F02D 19/082* (2013.01); *F02M 41/00* (2013.01); *F02M 43/00* (2013.01)

(58) Field of Classification Search
CPC ...... F02D 19/08; F02D 19/081; F02D 19/082
USPC ............. 123/456, 27 GE, 525, 531, 533, 575, 123/578
See application file for complete search history.

(56) References Cited

U.S. PATENT DOCUMENTS

| 4,385,615 | A | * | 5/1983 | Keane ............................ 123/514 |
| 5,097,803 | A | * | 3/1992 | Galvin .............................. 123/3 |
| 5,479,906 | A | | 1/1996 | Collie |
| 6,035,837 | A | * | 3/2000 | Cohen et al. ................... 123/575 |
| 7,861,696 | B2 | | 1/2011 | Lund |
| 8,516,997 | B2 | | 8/2013 | Pursifull |
| 2002/0062822 | A1 | * | 5/2002 | Watanabe et al. .............. 123/527 |
| 2007/0175459 | A1 | * | 8/2007 | Williams et al. ............... 123/575 |
| 2007/0264602 | A1 | * | 11/2007 | Frenette et al. ................ 431/253 |
| 2012/0143480 | A1 | * | 6/2012 | Pursifull ........................ 701/105 |
| 2014/0305409 | A1 | * | 10/2014 | Arndt et al. .................... 123/446 |
| 2015/0114351 | A1 | * | 4/2015 | Lund .............................. 123/457 |

OTHER PUBLICATIONS

Pursifull, Ross Dykstra, "System and Method for Improving Operation of an Engine Combusting Liquefied Petroleum Gas," U.S. Appl. No. 13/970,510, filed Aug. 19, 2013, 33 pages.
Pursifull, Ross Dykstra, "Method and System for Gaseous and Liquid Fuel Injection," U.S. Appl. No. 13/973,842, filed Aug. 22, 2013, 35 pages.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

A method for adjusting a fuel composition to increase liquid fuel heat tolerance is described that includes directly injecting a first fuel (such as liquid propane) to the engine via a fuel rail when a fuel temperature falls below a threshold; and in response to a fuel temperature greater than a threshold, directly injecting a liquid mixture of the first fuel and a second fuel (such as gasoline) via the fuel rail. For example, gasoline may be added in sufficient amounts to the liquid propane to ensure the mixture remains a liquid during engine operations. In this way, the amount of gasoline introduced into the propane may be based on an extent of the fuel temperature above the threshold which further acts to extend the operating range of the first fuel.

16 Claims, 7 Drawing Sheets

METHODS FOR ADJUSTING FUEL COMPOSITION TO INCREASE LIQUID FUEL HEAT TOLERANCE

FIELD

The present description relates to a fuel delivery system and methods for mixing fuels to adjust a fuel composition therein.

BACKGROUND AND SUMMARY

Liquified Petroleum Gas (colloquially referred to as Propane) may be compressed to a transportable liquid when used as a fuel within engine systems. However, to ensure that the propane remains a liquid during engine operations, additional measures may also be included that increase the complexity and cost therein. For example, to inject a liquid fuel via port fuel injection, the fuel rail may be cooled by returning the engine-heated fuel within the fuel rail to the fuel storage tank. However, such recirculation may result in storage tank heating as the returning hot liquid continually mixes with the cooler liquid remaining in the storage tank, which therefore limits the applicability of the liquid injection propane fuel system when operated in hot environments. Alternatively, to inject a fuel via direct fuel injection, intricate devices may be included within the fuel system whose function is to cool and pressurize the propane fuel while keeping it in the liquid phase and below the critical point.

Another approach may mix two fuels having different chemical compositions to enhance the thermal response of the fuel mixture. For example, U.S. Pat. No. 7,861,696 discloses a multi-fuel supply and co-injection system that mixes various combinations of fuels (both liquid and gaseous) together under the control of a microprocessor in a manner that enhances the utilization of the thermal content of the fuels based on the combustion efficiency and power output within the engine. However, the disclosed system also includes components, such as a fuel circulation pump, an accumulator, and a positive displacement pump for increasing the pressure of the gaseous propane in order to keep it a liquid within the engine system. Such components may degrade during operation, and thus temperature and/or pressure control of the fuel may correspondingly degrade, resulting in potential fueling errors.

The inventors have recognized the above issues, and others, with such approaches and herein disclose various embodiments, several of which include a method for adjusting a fuel composition to increase the liquid fuel heat tolerance of a first fuel (e.g., herein LPG) by introducing a second fuel (e.g., herein gasoline) to the first fuel in response to elevated fuel temperatures. For example, mixing the two fuels allows the fuel mixture to remain in the liquid phase and thereby prevents the first fuel from becoming a supercritical fluid during engine operation, which presents problems for engine pump and injector performance. Herein, one approach is described wherein the method includes directly injecting liquid propane to the engine via a fuel rail when a fuel temperature falls below a threshold; and in response to a fuel temperature greater than a threshold, directly injecting a liquid mixture of propane and gasoline via the fuel rail. The method further allows for the composition of the liquid mixture to be controlled by metering the amount of gasoline added to the liquid propane to ensure the mixture remains a liquid during engine operations. In this way, the technical result is achieved that the operating range of the first liquid fuel may be extended which may allow for fuel cooling to be reduced (or substantially eliminated in some instances) and the fuel pressurization to be reduced.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
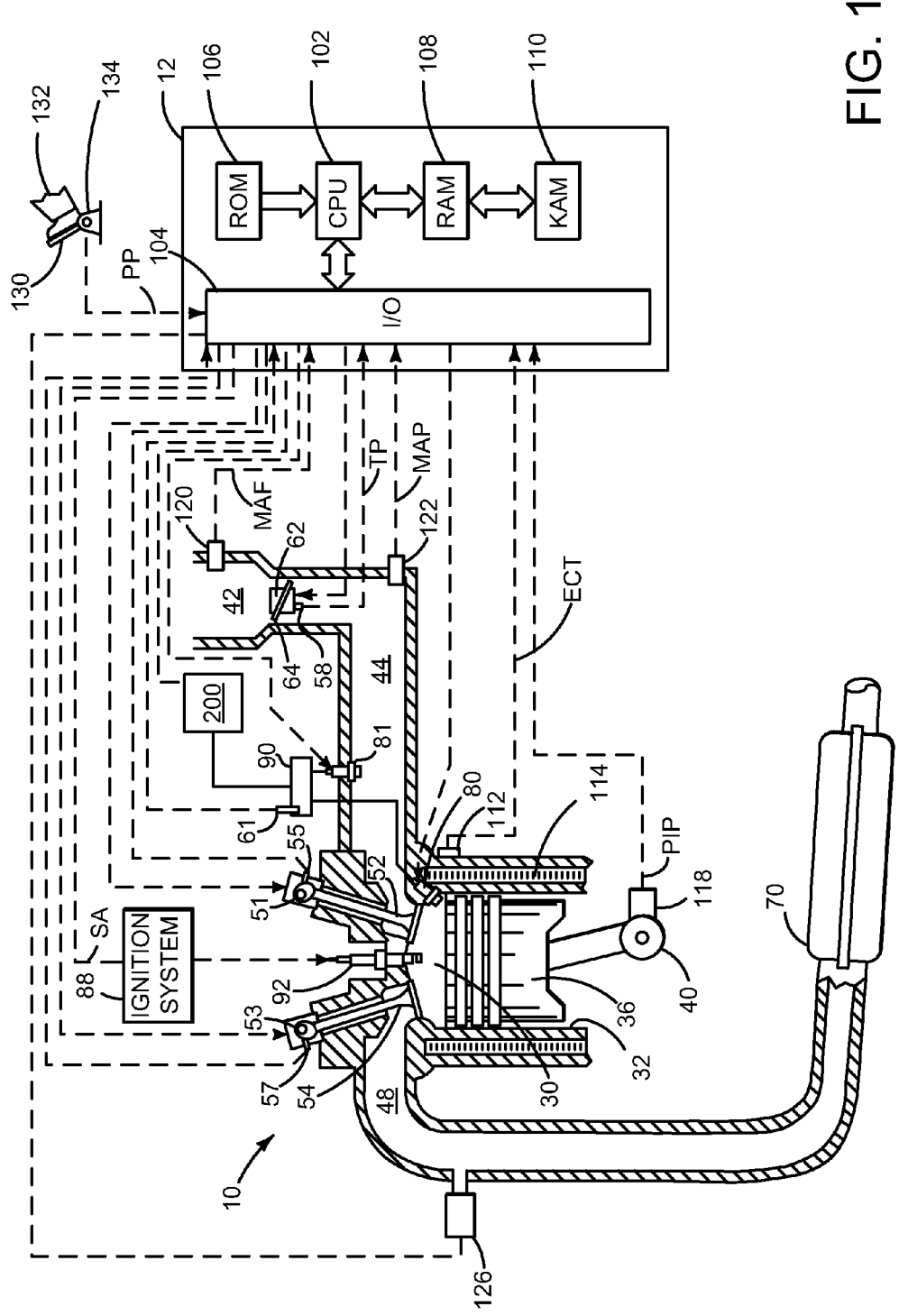
FIG. 1 is a schematic diagram of an engine.
Figure 2:
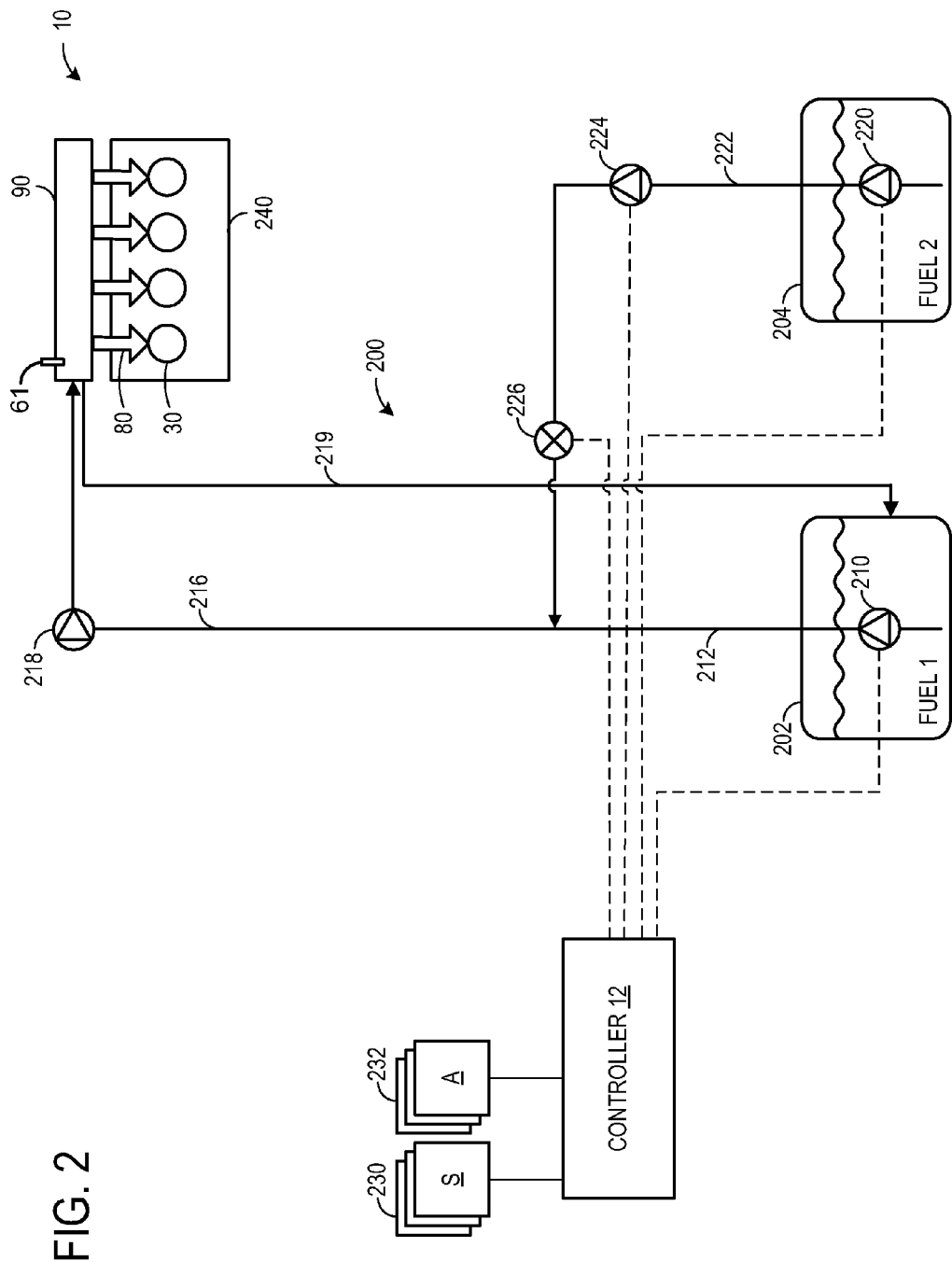
FIG. 2 shows an example fuel system according to the present disclosure.
Figure 3:
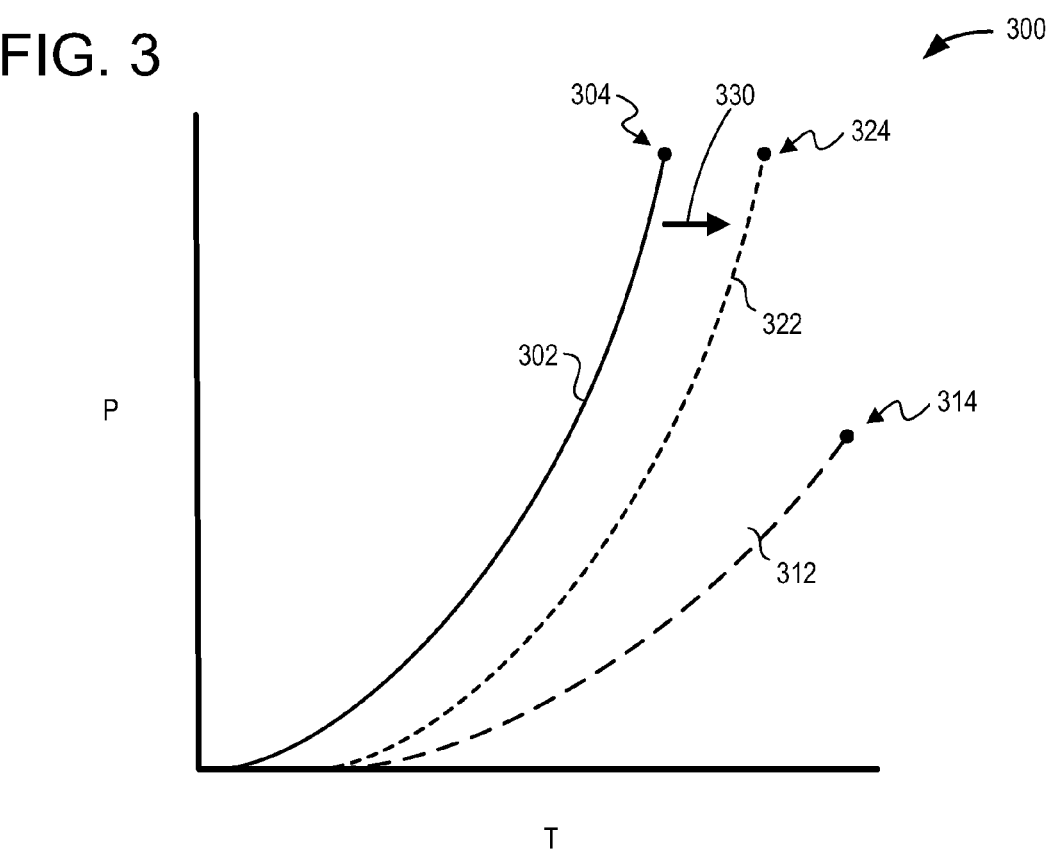
FIG. 3 schematically shows three example phase diagrams to illustrate how various substances and mixtures may have different physical properties that depend on temperature and pressure.
Figure 4:
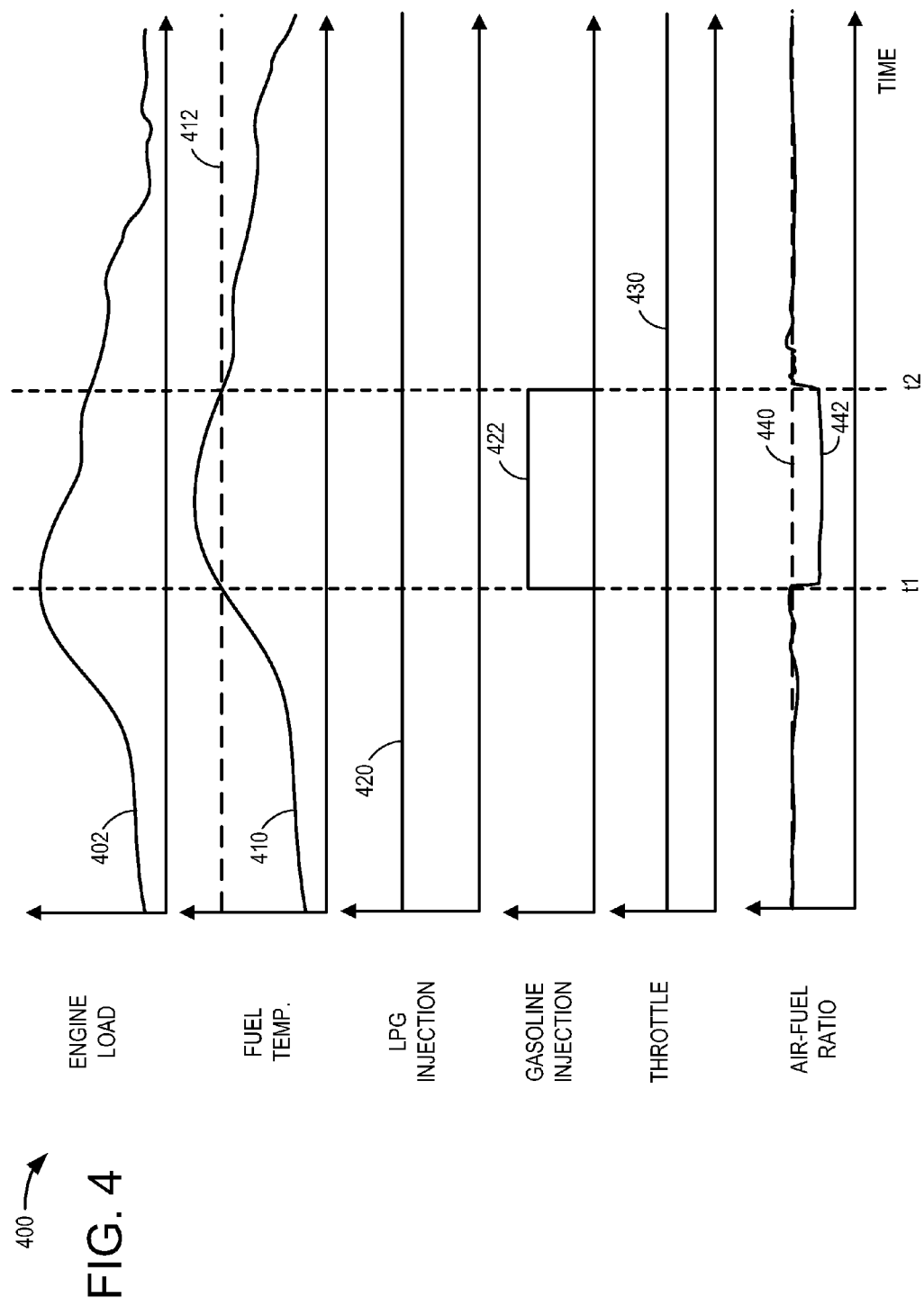
FIGS. 4-5 show example adjustments to a fuel injection profile when a second, liquid fuel is added to a first liquid fuel in response to elevated fuel temperatures at high engine loads.
Figure 5:
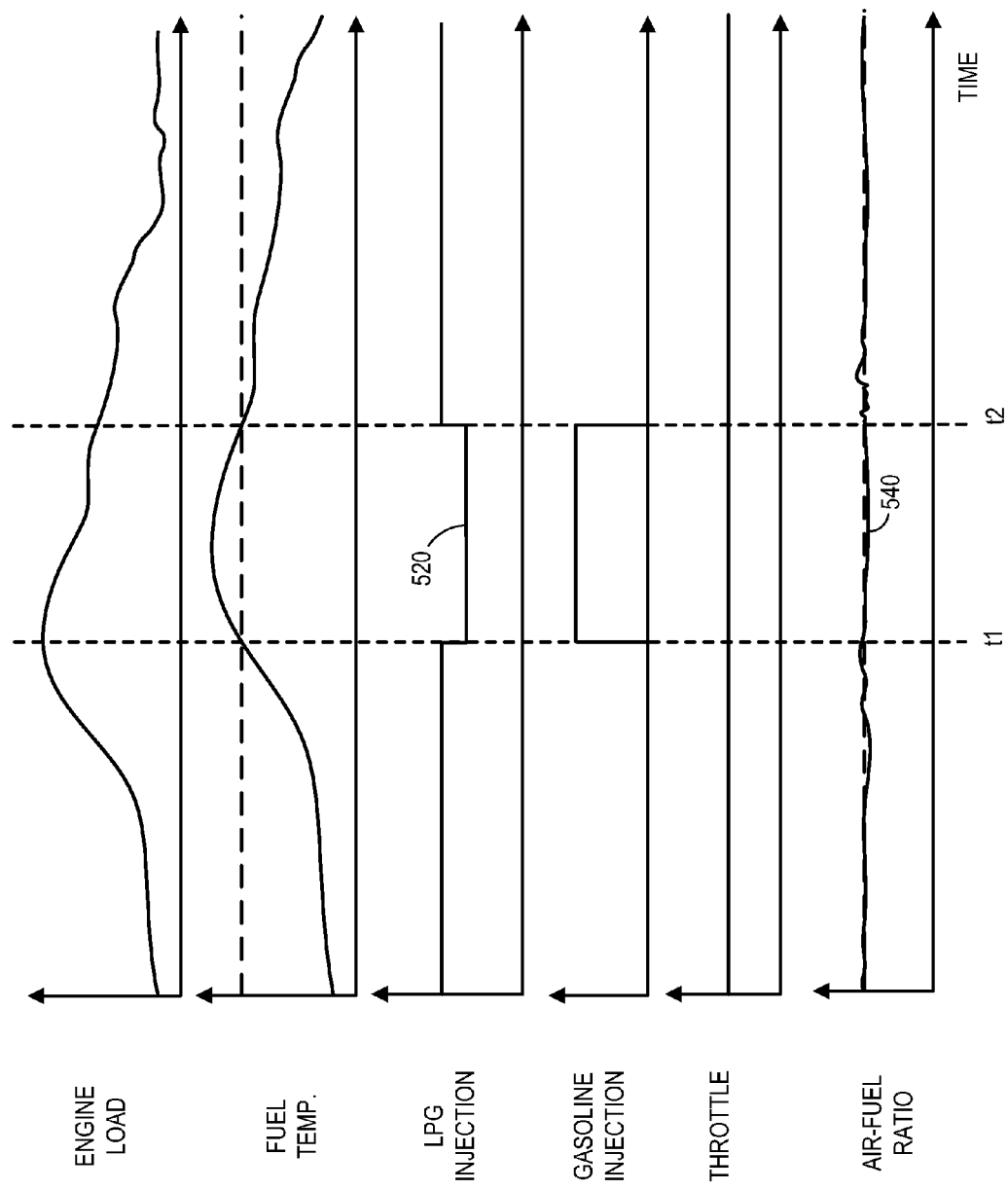
Figure 6:
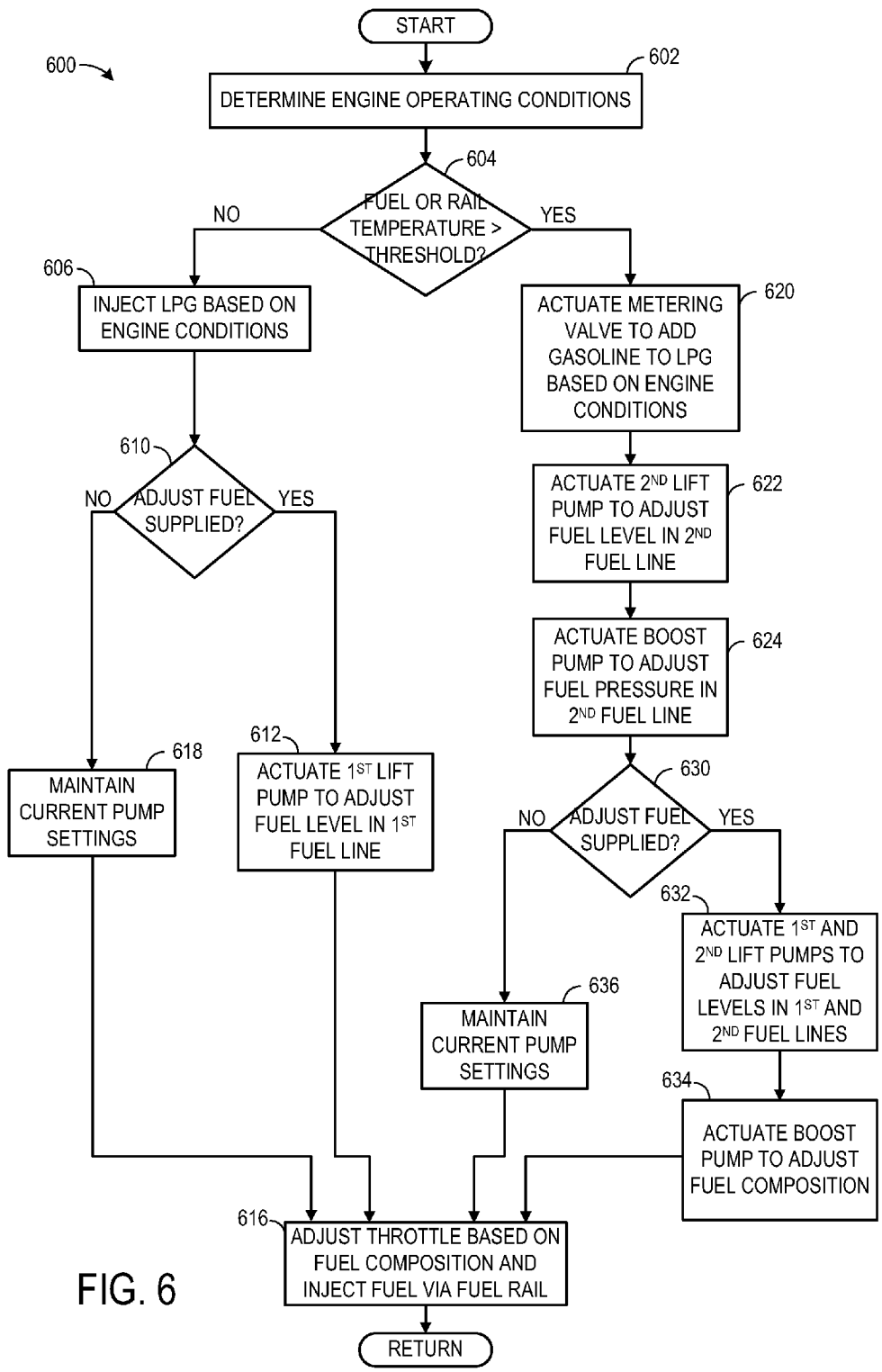
FIG. 6 is an example flow chart illustrating how one or more actuators in the fuel system may be adjusted to adjust the composition of the liquid fuel mixture in response to the elevated fuel temperature.
Figure 7:
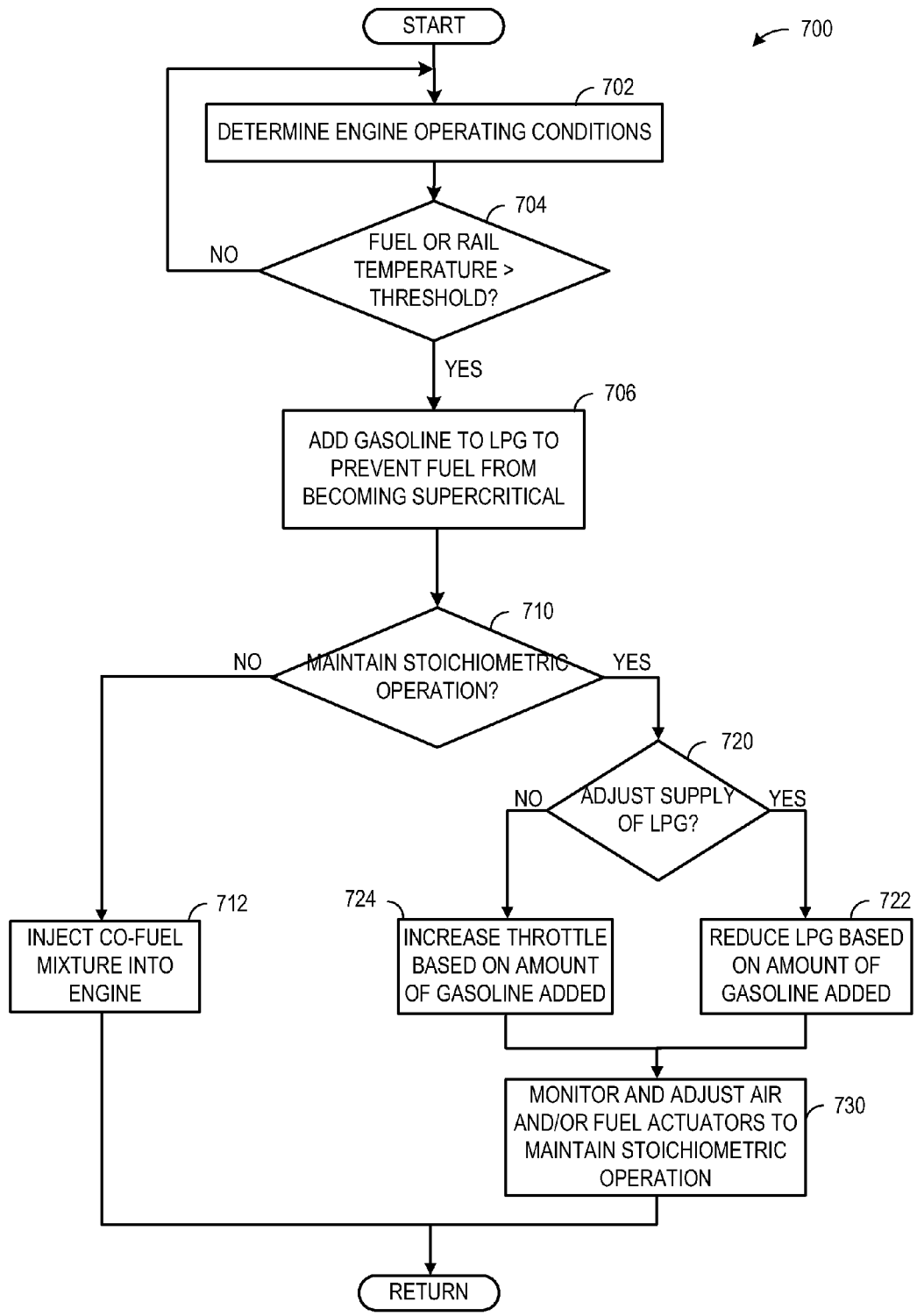
FIG. 7 is an example flow chart to illustrate how the fuel composition may be adjusted based on engine conditions.

The present description relates to embodiments of a fuel system for an internal combustion engine of a vehicle. FIG. 1 provides a schematic drawing of an engine system while FIG. 2 provides an example fuel system according to the present disclosure. In FIG. 3, phase diagrams for two example liquids are provided to show how each substance may exhibit different physical properties based on the prevailing pressure and temperature. Therein, an example mixture of the two substances is also shown to illustrate how the phase diagram may shift based on the composition of the mixture therein, which is further used to advantage in the system described to deliver under substantially all conditions a liquid fuel to the engine system. To illustrate example methods, FIGS. 4-5 show example fuel injection profiles when the second, liquid fuel is added to a first liquid fuel in response to elevated fuel temperatures at high engine loads. Then, FIGS. 6 and 7 show example flow charts, which may be used together and with the system of FIGS. 1-2, to illustrate how adjustments within the disclosed system may be made to further adjust a fuel composition therein. For simplicity, common reference numerals are used throughout the Detailed Description to refer to similar elements.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Direct liquid fuel injector 80 is shown positioned to inject liquid fuel directly into combustion chamber 30, which is known to those skilled in the art as direct injection. Alternatively, liquid fuel may be injected to an intake port via port fuel injector 81 that is positioned to inject liquid fuel into intake manifold 44, which is known to those skilled in the art as port injection. Direct liquid fuel injector 80 delivers liquid fuel in proportion to the pulse width from controller 12. In some embodiments, both direct fuel injector 80 and port fuel injector 81 may provide liquid fuel to engine 10. However, liquid fuel may be supplied solely via direct fuel injector 80 without port gaseous fuel injector 81 in other examples. Additionally, fuel may be supplied solely via port fuel injector 81 without direct fuel injector 80 in still other examples. For simplicity, herein engine 10 directly injects fuel via direct fuel injector 80. FIG. 2 further illustrates that fuel injector 80 may receive liquid fuel via fuel rail 90 that is delivered by liquid fuel system 200 that includes a fuel tank, fuel pump, and fuel rail. The fuel temperature in fuel rail 90 is sensed via temperature sensor 61, which in some instances may also or alternatively be a pressure sensor.

Intake manifold 44 is shown communicating with optional electronic throttle 62 that adjusts a position of throttle plate 64 to control air flow from air intake 42 to intake manifold 44. Electronic throttle 62 is shown positioned in between intake manifold 44 and air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In one example of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows example fuel system 200 coupled to engine 10 in greater detail. As noted above, engine 10 may comprise one or more combustion chambers for carrying out combustion reactions that power the engine within engine block 240. Each combustion chamber may be configured to receive a liquid fuel injection via fuel rail 90 and direct liquid fuel injector 80 coupled thereto. Although a direct injection system is described herein, in some embodiments, engine 10 may also or alternatively include one or more injectors configured for port fuel injection. In the examples provided, the first fuel is liquid propane (or LPG) and the second fuel is gasoline. It will be appreciated that in the following examples, a 1:1 usage of fuel and air in the cylinder is used to depict a substantially stoichiometric combustion mixture. Any additional fuel included in the mixture over the 1:1 (lambda) ratio may depict a combustion mixture that is richer than stoichiometry, with the richness increasing as the amount of additional fuel increases. However, in alternate examples, the air:fuel ratio may be different based on the desired air-to-fuel ratio of each mixture.

Turning to fuel system 200, one example configuration is provided to illustrate how a second liquid fuel (herein gasoline) may be added to a first liquid fuel (herein, LPG) in response to a fuel (or engine) temperature above a threshold during engine operation.

Therefore, fuel system 200 comprises a first fuel storage tank 202 for storing a first fuel to power the engine system, and a second fuel storage tank 204 for storing a second fuel to add into the first fuel to prevent the first fuel from becoming a supercritical fluid. Although the second fuel provides a means for preventing the first fuel from becoming supercritical, in some instances, the first fuel (herein LPG) may be circulated for a duration by returning fuel from fuel rail 90 to first fuel storage tank 202 through return line 219 before injection via a fuel rail in response to an engine start request while the fuel temperature is greater than the threshold.

First fuel storage tank 202 includes a lift pump 210 for raising the level of liquid fuel up through first fuel line 212. As described herein, the fuel lift pump operates to build pressure or suction in the storage tank, which thereby raises the fuel level. This feeds an engine-driven high pressure pump 218 to bring the fuel up to the requisite injection pressure. As described herein, the first fuel (or LPG) may be injected to engine 10 when a fuel temperature falls below a temperature threshold. Alternatively, when a fuel temperature increases or rises above a temperature threshold, in other words under hot operating conditions, a second fuel (or gasoline) stored within the second fuel storage tank may be added to the LPG and thereby enrich the fuel mixture. As such, the second fuel storage tank 204 also includes second lift pump 220 for raising the level of the second liquid fuel up through second fuel line 222. Generally, the first lift pump (or LPG) lift pump pressure that depends on tank temperature is substantially higher than the second lift pump 220 (or gasoline) lift pump pressure. For example, the LPG pressure can range from near zero pressure (e.g., substantially zero psi) at colder temperatures up to 325 psi at the highest design tank temperature. Thus, a gasoline boost pump may be used to introduce gasoline into the high pressure pump inlet where LPG is present. For this reason, boost pump 224 is included for increasing the fluid pressure within the second fuel line before the gasoline is combined with LPG via metering valve 226, which is valve configured for adjusting the amount of gasoline added to the LPG based on a fuel temperature and/or the engine operating conditions. As described above, upon combining the second fuel with the first fuel when a fuel temperature is greater than a temperature threshold, the resulting liquid mixture may also flow through common fuel line 216 for injection to engine 10. The method thus further comprises controlling a composition of the liquid mixture by metering an amount of second fuel (e.g., gasoline) added to the first fuel (e.g., LPG), wherein the amount of the second fuel added is based on an extent of the fuel temperature above the threshold. For example, while the fuel temperature is increasing above the temperature threshold, metering valve 226 may be opened based on the temperature change to increase the amount of gasoline added to the LPG. As such, the portion of gasoline in the liquid mixture may increase as the extent of the fuel temperature above the threshold increases. Conversely, while the fuel temperature is decreasing above the temperature threshold, metering valve 226 may be closed based on the temperature change to reduce the amount of gasoline added to the LPG.

To enable such adjustments, controller 12, which is shown coupled to sensors 230 and actuators 232 may adjust one or more fuel flows by adjusting a lift pump (e.g., by adjusting a pressure from first lift pump 210 and/or second lift pump 220) or a boost pump (e.g., by adjusting boost pump 224). Additionally, controller 12 may be configured to adjust metering valve 226 based on engine operating conditions and thereby control the amount of the second fuel introduced to the first fuel. Herein, the fuel temperature may be a temperature of the fuel measured or estimated at any position within the fuel or engine system. For example, in one instance, the fuel temperature may be a fuel rail temperature that is measured by temperature sensor 61. In this way, fuel system 200 that is coupled to engine system 10 may be configured to add a second fuel to the first fuel in order to prevent the first fuel from becoming a supercritical fluid since a fuel pump and/or fuel injector performance may be compromised and therefore become highly inefficient in response. The fuel system herein may have other advantages since addition of the second fuel further allows the fuel temperature and pressure to be operated higher than is allowable compared to the first fuel alone. In this way, the operating range of the fuel may be extended by the methods described.

With regard to the physical properties of the fuels, FIG. 3 schematically shows example phase diagrams to illustrate how different substances exhibit different physical properties based on pressure and temperature. As shown therein, FIG. 3 includes phase curves for two substances and an example mixture of the two substances to illustrate how the physical properties may vary in a manner that depends on the composition of the fuel mixture. In other words, the example phase diagram that represents the mixture can be adjusted based on the composition therein (e.g., the ratio of the number of solute particles to the number of solvent particles in the solution) and not on the type of chemical species present. To the left or above a curve is liquid. To the right or below a curve is vapor. At a pressure or temperature beyond the dot, the fluid is supercritical. The second fuel may or may not exhibit a supercritical temperature or pressure within the temperature range of interest. Of course, other substances may have different physical properties and so exhibit different curves by comparison to the curves shown.

For the second fuel to be effective at preventing the first fuel from becoming a supercritical fluid at elevated temperatures and/or pressure, the phase transition of the first fuel may lie substantially within the liquid region above the phase transition of the second fuel. As such, the second fuel may remain a non-volatile liquid under conditions wherein the first fuel undergoes a phase transition between the liquid and gaseous phases, for example, in response to an increased temperature. Or, alternatively, the second fuel may remain a non-volatile liquid while the first fuel undergoes a phase transition to a supercritical fluid via both pressure and temperature increases as sometimes happens within the fuel system of a vehicle.

For simplicity, graph 300 schematically shows a pressure and temperature phase diagram for a first fuel (e.g., LPG), a second fuel (e.g., gasoline), and an example mixture of the two fuels (e.g., 85% LPG, 15% gasoline). In the figure, temperature is shown along the abscissa and temperature increases from left to right, and pressure is shown along the ordinate and pressure increases from bottom to top.

With respect to the first fuel, first transition 302 separates the liquid and gaseous phases of the isolated chemical substance. Therefore, the region of graph 300 to the left (or above) first transition 302 represents a region wherein the first fuel exists in the liquid phase. Conversely, the region to the right (or below) first transition 302 represents a region wherein the first fuel exists in the gaseous phase. Points along the line itself represent the phase transition between the liquid and gaseous phases wherein both phases are present. The point at the end of first transition 302 is first critical point 304 (e.g., Pc=42.5 bar, Tc=96.6° C. for LPG) beyond which the substance is a supercritical fluid. Therefore, at temperatures above the critical point, a substance may become a supercritical fluid and exhibit both liquid-like and gaseous-like properties such that distinct liquid and gas phases cease to exist. For example, a supercritical fluid may effuse through solids like a gas, but also dissolve materials like a liquid. When a fuel becomes supercritical, operation of mechanical parts within the fuel system (e.g., an injection pump) may also become problematic. Therefore, the method according to the present disclosure allows for the addition of a second fuel to the first fuel to extend the operational range of the fuel system by preventing the first fuel from becoming a supercritical fluid.

In a similar manner, second transition 312 separates the liquid and gaseous phases of the second substance. As such, the region of graph 300 to the left (and above) second transition 312 represents a region wherein the second fuel exists as a liquid while the region to the right (and below) represents a region where the second fuel exists as a gaseous substance. As described above, second transition 312 therefore represents the phase transition between the liquid and gaseous phase for the second substance. Second critical point 314 is shown at the end of the second transition curve and represents the pressure and temperature above which the substance becomes a supercritical fluid (e.g., Pc=24.9 bar, Tc=296.8° C. for gasoline). For simplicity, first transition 302 lies substantially entirely to the left of second transition 312, and within the liquid phase of the second substance. Thereby, the first substance undergoes a phase transition from the liquid to the gaseous phase while the second substance remains a liquid.

Third transition 322 is further shown to illustrate how mixing two substances together alters the physical properties of the first substance compared to the isolated first substance. Therein, third transition 322 lies to the right of first transition 302 and indicates that a mixture of two substances may vaporize at higher temperatures than the first substance alone. Furthermore, third critical point 324 may also be altered such that the mixture becomes a supercritical fluid at higher temperatures. In this way, adding the second substance to the first substance produces a curve shift 330 whose precise location relative to the isolated substance depends on the composition of the mixture. As described, the fuel system herein may adjust the composition of the fuel mixture to further adjust the placement of the transition curve via curve shift 330 and thereby prevent the first fuel from becoming a supercritical fluid during engine operations.

Now turning to FIG. 4, map 400 depicts an example fuel injection adjustment in a multi-fuel engine system responsive to elevated fuel temperatures. As shown therein, when the fuel reaches a threshold temperature, the fraction of gasoline in the fuel is increased to raise the temperature that the fuel can operate without becoming supercritical. Thereby, the adjustments made enable the operating range of the first fuel to be extended by mixing with a portion of second fuel. However, since LPG and gasoline have different fluid and energy densities, and since the propane is diluted with gasoline upon combining the two fuels, in some instances the fuel injection may be adjusted to account for the change in the combined overall air-fuel ratio and/or combined density.

As depicted therein, the fuel injection profile shown may be used during high engine load conditions in response to fuel temperatures above a threshold temperature. In particular, an amount of second fuel is added based on the difference between the elevated fuel temperature and the threshold temperature so as to generate a combustion mixture in the cylinder that is richer than stoichiometry. For example, the second liquid fuel may be added to the first liquid fuel to create a liquid mixture in order to prevent the first liquid fuel from becoming a supercritical fluid. However, in some instances the second fuel may be added to the first fuel based on the extent of the fuel temperature above the threshold, or the second liquid fuel may also be added to provide a cooling effect that reduces the fuel temperature and thereby prevents the liquid mixture from reaching a critical point. Thus, in the depicted example, the first fuel is injected to meet the engine torque demand while the second fuel is injected to prevent the first fuel from becoming a supercritical fluid.

Map 400 schematically depicts an engine load at 402 and a fuel temperature at 410. In the example shown, the fuel temperature 410 generally mimics engine load 402, but is delayed by comparison to allow for the heat transfer that occurs between engine 10 and fuel system 200 which may be spatially removed from each other in some instances. Threshold 412 reflects the fuel temperature above which the second liquid fuel is added to the first fuel in order to prevent it from becoming a supercritical fluid. For instance, as one example, threshold 412 may be 96.6° C. Therefore, below 96.6° C., LPG is injected to the engine. However, above 96.6° C., wherein LPG becomes a supercritical fluid under some conditions, a distinct liquid or gas phase may not be present, which renders the injection of fuel to the engine problematic. As such, gasoline is added to the LPG at temperatures above 96.6° C. in order to create a liquid mixture that prevents the LPG or fuel mixture from becoming a supercritical fluid. Within map 400, plot 420 depicts fueling of a first, liquid fuel (herein LPG) to engine 10, while plot 422 shows that a second, liquid fuel (herein gasoline) is engaged while fuel temperature 410 is above threshold 412. Plot 430 further shows an intake aircharge delivered to the cylinder, and changes in cylinder combustion air-fuel ratio (AFR) are depicted at plot 442 relative to a stoichiometric AFR 440.

Prior to t1, the engine may be operating with only a first, liquid fuel, herein LPG (plot 420), injected into the cylinder to meet engine torque demands (shown in plot 402). The amount of LPG injected may be adjusted to be proportional to the amount of intake aircharge received in the cylinder (plot 430) so as to operate the cylinder with an overall combustion air-fuel ratio (plot 442) that is substantially at or around stoichiometry (dashed line 440). In addition, an engine controller may inject a first amount of LPG into the engine cylinder based on the amount of intake air received in the cylinder, to provide a stoichiometric combustion air-fuel ratio.

Prior to t1, engine load may increase, and while LPG is used to meet the engine load, a fuel temperature may gradually increase (plot 410) until at t1, the fuel temperature is above threshold temperature 412. In response to elevated fuel temperatures, while maintaining injection of the LPG, and while maintaining the spark timing at peak torque timing, an engine controller may increase injection of a second, liquid fuel, herein gasoline, to prevent the first fuel from becoming a supercritical fluid (plot 422). For example, the controller may add a second amount of gasoline into the cylinder between t1 and t2. Herein, the second amount of gasoline introduced into the fuel supply is based on the elevated fuel temperature above the threshold, and the amount introduced may be increased as a difference between the exhaust temperature and threshold temperature increases. Upon adding gasoline into the LPG fuel stream, controller 12 may be configured to account for the change in fuel density (e.g., based on the fuel's combination density) and air-fuel ratio in the fuel injection strategy. Therefore, while the net combustion energy (e.g., in joules) of fuel injected may not change drastically, the actual volume of fuel injected may change substantially. As one example, a volume of gasoline that is approximately 25% less than the volume of LPG may be injected to engine 10. Thus, if a 50/50 mix of gasoline and LPG was to be injected via common fuel line 216 and fuel rail 90, a volume of fuel reduced by approximately 12.5% may be injected to engine 10 compared to injection of a 100% LPG fuel. Furthermore, in some examples, it will be appreciated that the amount of the first LPG fuel may not be adjusted responsive to the elevated fuel temperature but may be maintained at an amount that provides a stoichiometric relation with aircharge in the cylinder. However, in other examples, the amount of the second gasoline fuel may be adjusted responsive to the elevated fuel temperature with the amount of fuel added in addition to the first fuel injection amount so as to provide a (net) richer than stoichiometric relation (of total fuel) with aircharge in the cylinder. By increasing injection of gasoline while maintaining injection of LPG, the liquid fuel mixture may be used to meet the engine power demand. In one example, a combination of 100% LPG with 0-15% gasoline may be used while maintaining spark timing at MBT. Although the methods herein describe adding a second fuel to a first fuel in order to adjust a composition based on an engine operating condition, in another embodiment, the liquid mixture of propane and gasoline may be premixed and stored in a single fuel tank. Then, the premixed composition of the liquid mixture may establish a second temperature threshold based on the composition of the liquid mixture, wherein the premixed liquid solution is injected to the engine via the fuel rail while the temperature falls below the second temperature threshold.

Between t1 and t2 the liquid gasoline is used to prevent the LPG from becoming a supercritical fluid until at t2 the fuel temperature falls below threshold temperature 512. Accordingly, at t2 injection of gasoline may be stopped, and injection of LPG may be continued. It will be appreciated that while the depicted example shows a constant enrichment profile between t1 and t2 in alternate embodiments, the enrichment profile used between t1 and t2 may be varied based on, for example, the change in fuel temperature. The enrichment profile may be initiated with an amount of second fuel adjusted based on the initial difference between the fuel temperature and the threshold temperature. Then, as the fuel cools, the amount of gasoline injected may be gradually decreased as the difference between the fuel temperature and the threshold temperature gradually decreases. This may result in an enrichment profile that tapers down between t1 and t2.

In one example, a controller with computer readable instructions may be configured to adjust an amount of fuel injected by injecting a variable ratio of the first fuel and the second fuel. For example, in response to elevated fuel temperatures, the controller may enrich the fuel mixture by selectively increasing injection of the second fuel while maintaining injection of the first fuel and while also maintaining spark ignition timing at MBT, the enrichment being based on the elevated fuel temperature. The enrichment may further include increasing a degree of the enrichment as the fuel temperature exceeds a threshold temperature until a threshold degree of enrichment is reached. Further, an amount of second fuel injected may be based on one or more of a flammability limit of the second fuel, an octane rating of the second fuel, and an alcohol content of the second fuel. Moreover, in one embodiment, the direct injection system may be designed to inject a volume of fuel based on the engine operating conditions. Thus, the controller may be programmed to factor in the fuel densities (or energy densities) to the mass based air-fuel ratio to determine a volume of fuel to inject.

Briefly, FIG. 5 depicts map 500 of an example fuel injection adjustment in a multi-fuel engine system responsive to elevated fuel temperatures. For simplicity, the engine load and fuel temperature plots described above with respect to FIG. 4 are reproduced while additional adjustments are described that maintain a stoichiometric engine operation. For example, map 500 in FIG. 5 shows that at t1 the supply of LPG may be reduced in coordination with the introduction of gasoline into the fuel supply. As such, controller 12 may include instructions for adjusting the composition of the liquid mixture based on one or more fuel flows. The combination of the reduced LPG fuel supply at 520 with the second fuel 422 while the fuel temperature is above the threshold allows for a substantially constant air-fuel ratio 540 with respect to stoichiometric operation (e.g., the dashed line). Thereby, the combination of the two fuels injected is mixed to have a composition for supplying combustion energy while the second fuel acts to prevent the first fuel from becoming a supercritical fluid in response to the high fuel temperatures. In this way, an engine system having the capabilities described herein may be configured to maintain a stoichiometric operation during episodes of hot fuel handling.

Turning to control of the methods, FIG. 6 shows an example flow chart illustrating method 600 for adjusting one or more actuators in the fuel system in order to adjust a fuel supply within engine 10.

At 602, method 600 includes determining engine operating conditions of the vehicle. For example, driving up a mountainous terrain may require a high engine load. In response, large amounts of heat may be produced within the engine that further produces an increased fuel temperature. Therefore, at 604, method 600 includes monitoring a temperature within the fuel system to determine whether a fuel temperature is above a threshold. In some instances, the fuel temperature may be a fuel rail temperature, a temperature of the fuel within a fuel line, and/or an estimated temperature based on one or more engine operating conditions (e.g., an engine temperature).

When a fuel temperature falls below the temperature threshold, at 606, the fuel system is configured to inject the first fuel (e.g., LPG) based on the engine operating conditions. For example, in FIG. 2 LPG was stored in first fuel storage tank 202 and delivered through first fuel line 212, and common fuel line 216 to fuel rail 90 and further into engine 10. However, since an engine load may continuously change under some driving conditions, at 610, method 600 includes adjusting one or more actuators within liquid fuel system 200 to adjust the level of LPG delivered therethrough. If the LPG supplied is to be adjusted, for instance, in response to an increased speed detected by position sensor 134 coupled to an accelerator pedal 130 for sensing force applied by foot 132, at 612, controller 12 may actuate lift pump 210 to increase a pressure within first storage tank 202 and thereby increase the amount of LPG within the fuel line. Additionally or alternatively, based on the engine-driven fuel pump 218, which is a pump designed to draw the fuel through the fuel lines and significantly increase its pressure for direct fuel injection, an appropriate amount of fuel may be delivered to engine 10 based on an engine load. At 616, controller 12 may further adjust a throttle based on the adjustments made (and thereby adjust the fuel composition) to maintain a stoichiometric engine operation based on the engine operating conditions. If no adjustments to the fuel supplied are to be made based on the engine operating conditions, at 618, the engine may maintain the current pump and throttle settings.

Returning to 604, if a fuel temperature is greater than a threshold temperature, at 620, controller 12 may actuate metering valve 226 to introduce gasoline stored within second fuel storage tank 204 into the fuel supply. As described in detail above, the two substances mix as the liquid fuel is delivered to engine 10 via common fuel line 216. As also described herein, controller 12 may be configured to add the gasoline to the LPG fuel supply based on the extent of the fuel temperature above the threshold. Furthermore, controller 12 may also include programmable instructions for adjusting the amount of fuel delivered and/or a throttle based on the engine operating conditions. Once introduced into the LPG fuel supply, at 622 and 624, second lift pump 220 and boost pump 224, respectively, may adjust the amount of gasoline delivered such that the fuel supplied remains a liquid during engine operations.

Depending on the engine load, at 630, controller 12 may also be configured to adjust the ratios of the two fuels as was described with respect to FIGS. 4-5. As such, if the composition of the fuels is to be adjusted, at 632 and 634, controller 12 may adjust one or more of a lift pump and boost pump, respectively, to further adjust the ratios of the fuels while ensuring that sufficient fuel is delivered to the engine based on the engine load, and moreover, to prevent the LPG from reaching a critical point wherein the fuel becomes a supercritical fluid. For example, as noted above, addition of the second fuel may lead to a cylinder enrichment. Therefore, when metering valve 226 is opened to introduce the second fuel into the fuel supply, a rich fuel mixture may be injected to engine 10. In response, the amount of the first fuel supplied may be reduced by, for instance, reducing the flow rate of the first fuel in first fuel line 212 by adjusting first lift pump 210 to reduce a pressure within first storage tank 202. Furthermore, because a larger amount of second fuel may be added to the fuel supply responsive to a larger difference between the elevated fuel temperature and the threshold temperature by adjusting a pressure within second storage tank 204 (e.g., by adjusting one or more of second lift pump 220 and boost pump 224) and/or a degree of opening of metering valve 226, when the amount of the second fuel added is increased, the amount of first fuel supplied may be reduced in conjunction with the increased amount of second fuel to maintain an engine operation based on the engine output until the exhaust temperature is brought within the threshold temperature. Alternatively, when the amount of the second fuel added is decreased, for example, because the fuel temperature is decreasing while it remains above the threshold, the amount of first fuel supplied may be increased in conjunction with the decreased amount of second fuel to maintain an engine operation. Based on the pump adjustments made, at 616, engine 10 may also and/or optionally adjust a throttle to maintain a stoichiometric engine operation while the vehicle is being operated. As described above, if no changes are to be made to the fuel composition once the second fuel has been introduced into the fuel supply (e.g., because a short burst of the second fuel is introduced into the fuel supply), at 636, the fuel system may maintain the current pump settings to deliver the amount of gasoline for preventing the LPG from becoming a supercritical fluid. Thereafter, a throttle may be optionally adjusted at 616 to maintain the engine operations. Once the gasoline is added into the fuel supply, the engine system may continue monitoring engine operations and conditions as the fuel supply is managed during vehicle operations.

FIG. 7 is an example flow chart of method 700 for adjusting the fuel composition based on the engine operating conditions. For simplicity, the flow chart illustrates various adjustments for optimizing the fuel composition and engine stoichiometry based on an elevated fuel temperature. As shown therein, at 702 method 700 includes monitoring conditions within the engine and, in some instances, making adjustments based on one or more conditions detected. For example, at 704, controller 12 may be configured to monitor a fuel temperature and further make adjustments based on the temperature compared to a threshold. In some instances, the fuel temperature may be determined by a fuel rail temperature sensor (e.g., temperature sensor 61) while in other instances, the fuel temperature may be estimated based on an engine temperature, or even based on an engine speed and load in still other cases. In response to an elevated temperature, or a temperature above a threshold, at 706, engine 10 may add gasoline to the LPG to prevent the fuel from becoming supercritical, for instance, as the load on the vehicle increases and the temperature and pressure within the fuel system increase responsive to the increasing load. However, if the fuel temperature falls below the threshold, engine 10 may continue to monitor the engine conditions while adjusting a fuel level based on the engine speed and load.

Upon introducing the gasoline into the LPG fuel supply, the fuel delivered to engine 10 may become enriched. Therefore, according to the system herein, at 710, engine 10 may be configured to make adjustments to maintain engine operations in response to the enriched fuel, which may decrease emissions and thereby allow for more efficient engine operations. However, in its simplest form, the methods described herein may simply add an amount of gasoline into the LPG to ensure that the first fuel does not reach a critical point during operations at an elevated temperature and/or pressure. Therefore, controller 12 may be configured to meter valve 226 by simply opening and closing a valve that allows a known amount of gasoline to flow there through. Then, upon mixing, at 712, the mixture may be co-injected into the engine during the engine drive cycle.

Alternatively, if the engine is to make adjustments for maintaining an engine stoichiometry during operation, two different options are possible. As one example, at 720, controller 12 may also adjust a flow of LPG from first storage tank 202 based on the amount of gasoline introduced into the mixture. In some instances, this may be done because the second fuel also burns within the engine cylinder to produce energy that can be converted into engine output. In this sense, in addition to preventing the first fuel from becoming a supercritical fluid, the second fuel may also act as a fuel to provide power during operations. In response, the amount of first fuel supplied may therefore be reduced in accordance with the usage demanded by a vehicle driver during operations. At 730, engine system 10 may continue to monitor engine operations to adjust one or more of an air and fuel supply during operations to maintain engine operations. Alternatively, if the amount of LPG supplied is not to be adjusted, for example, because the amount of fuel remaining in the first storage tank is low, at 724, controller 12 may increase a throttle based on the enriched mixture in order to maintain a stoichiometric engine operation during the engine drive cycle. Then, based on engine usage while the fuel temperature is above the threshold, at 730, controller 12 may continue to monitor one or more of each fuel supply and/or a throttle based on the engine speed and load. In some instances, controller 12 may alternatively reduce an intake throttle opening to reduce cylinder air charge.

In this way, the fuel system may efficiently adjust the fuel composition to increase the liquid fuel heat tolerance of the first fuel (herein LPG) under some conditions by introducing a second fuel (herein gasoline) into the first fuel, which reduces the potential of the first fuel reaching a critical point above which the first fuel may become a supercritical fluid. The method further allows for the composition of the liquid mixture to be controllably adjusted by metering an amount of the second fuel added to the first fuel such that sufficient amounts are added to ensure the mixture remains a liquid during engine operations. In this way, the operating range of the first liquid fuel may be extended which further allows for complex fuel cooling systems to be reduced or substantially eliminated in some instances and the fuel pressurization to be reduced.

Note that the example control and estimation routines included herein can be used with various engine and/or vehicle system configurations. The control methods and routines disclosed herein may be stored as executable instructions (executable by the processor) in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   directly injecting liquid propane, without gasoline, to the engine via a fuel rail responsive to a fuel temperature below a threshold;
   in response to a fuel temperature greater than the threshold, directly injecting a liquid mixture of propane and gasoline via the fuel rail; and
   adjusting a composition of the liquid mixture by metering a sufficient amount of gasoline added to the propane so the mixture remains a liquid.

2. The method of claim 1, wherein the amount of gasoline added to the propane is based on an extent of the fuel temperature above the threshold.

3. The method of claim 2, further comprising adjusting an amount of propane injected based on the amount of gasoline added to maintain a stoichiometric operation of the engine.

4. The method of claim 2, further comprising adjusting a throttle based on the amount of gasoline added to maintain a stoichiometric overall air-fuel mixture combusted in cylinders of the engine.

5. The method of claim 1, wherein the fuel temperature is a fuel rail temperature.

6. The method of claim 1, wherein a controller configured to add gasoline to the propane includes programmable instructions in memory for metering the gasoline added to the propane based on engine operating conditions.

7. A method for an engine, comprising:
   directly injecting liquid propane, without gasoline, to the engine via a fuel rail responsive to a fuel temperature below a threshold;
   in response to a fuel temperature greater than the threshold, directly injecting a liquid mixture of propane and gasoline via the fuel rail, wherein the liquid mixture of propane and gasoline is premixed and stored in a single fuel tank, wherein
   the premixed liquid is injected to the engine via the fuel rail responsive to a temperature below a second temperature threshold, the second threshold based on a composition of the liquid mixture.

8. The method of claim 7, wherein the fuel temperature is a fuel rail temperature.

9. A method for an engine, comprising:
   directly injecting liquid propane, without gasoline, to the engine via a fuel rail responsive to a fuel temperature below a threshold;
   adding gasoline to the liquid propane to maintain the mixture as a liquid in response to a fuel temperature greater than the threshold,
   controlling a composition of the mixture based on an extent of fuel temperature above the threshold; and
   adjusting a throttle based on an amount of gasoline added to maintain a stoichiometric overall air-fuel mixture combusted in cylinders of the engine.

10. The method of claim 9, wherein controlling the composition of the liquid mixture includes adjusting a metering valve to adjust the amount of gasoline added to the liquid propane.

11. The method of claim 10, further comprising adjusting an amount of propane injected responsive to the amount of gasoline added to maintain a stoichiometric operation of the engine.

12. The method of claim 10, wherein a portion of gasoline in the liquid mixture increases as the extent of the fuel temperature above the threshold increases.

13. The method of claim 12, wherein the liquid mixture of gasoline and propane allows one or more of a fuel temperature and fuel pressure to be operated higher relative to liquid propane alone.

14. The method of claim 13, wherein increasing one or more of the fuel temperature and fuel pressure extends an operating range of the propane.

15. The method of claim 10, wherein the composition of the liquid mixture prevents the liquid mixture from becoming a supercritical fluid.

16. The method of claim 9, wherein the propane is circulated for a duration before injection via a fuel rail in response to an engine start request while the fuel temperature is greater than the threshold.

* * * * *